United States Patent [19]

Guyer

[11] 4,066,554
[45] Jan. 3, 1978

[54] FILTRATION APPARATUS

[75] Inventor: August Guyer, Zurich, Switzerland

[73] Assignee: Escher Wyss Limited, Zurich, Switzerland

[21] Appl. No.: 746,105

[22] Filed: Nov. 30, 1976

[30] Foreign Application Priority Data

Dec. 11, 1975 Switzerland ............... 016074/75

[51] Int. Cl.$^2$ ............................................. B01D 33/06
[52] U.S. Cl. ..................................... 210/342; 210/402
[58] Field of Search .................. 210/77, 78, 325, 326, 210/360 R, 360 A, 370, 380, 385, 402, 403, 342; 162/384; 233/2

[56] References Cited

U.S. PATENT DOCUMENTS

| 2,368,876 | 2/1945 | Puig Y Terradas | 210/325 X |
| 3,241,676 | 3/1966 | Neuville et al. | 210/77 |
| 3,451,550 | 6/1969 | Cox | 210/78 |
| 3,797,662 | 3/1974 | Titus | 210/78 |

Primary Examiner—William A. Cuchlinski, Jr.
Attorney, Agent, or Firm—Robert A. Ostmann

[57] ABSTRACT

Filtration apparatus comprising in a housing an annular filtration chamber which is supplied with a suspension under pressure. The chamber is bounded between an external and an internal surface both of them in a form of a body of revolution, at least one of them being formed as a filtering surface and in the case connected to a filtrate discharge collector. At least one of the surfaces is capable of rotating. The chamber is connected at one end to a suspension inlet and on its other end to a product outlet. The surfaces bounding the filtration chamber are arranged eccentrically relatively to one another whereby a sufficient passage for the product is left free between the surfaces even in the narrowest figure of the eccentrical profil of the filtering chamber.

6 Claims, 3 Drawing Figures

FILTRATION APPARATUS

BACKGROUND OF THE INVENTION

The invention relates to a filtration apparatus comprising in a housing filtration chamber into which there is admitted a suspension which is under pressure, the said chamber being bounded between an external surface in the form of a body of revolution and an internal surface which is nested therein and is also in the form of a body of revolution; at least one of the surfaces is formed as a filtering surface and in the case is connected to a filtrate discharge collector; at least one of the surfaces in the form of a body of revolution is capable of rotating; the annular filtration chamber is connected at one of its ends to a suspension inlet and at its other end to a product outlet.

In filtration apparatus of this kind, the suspension which is to be processed is introduced under pressure into the annular filtration chamber, the liquid component of the suspension passing through the filtration surfaces and being taken away as a filtrate by means of respective filtrate discharge collectors. The filtered product moves through the filtration chamber which is formed of coaxially arranged filtration surfaces, and is discharged therefrom by means of a product outlet. In order to obviate the formation of a solid cake layer of product on the filtration surfaces, advantageously the filtration surfaces are arranged to be capable of rotating in opposite directions to one another. As a result, shearing forces acting in the direction of revolution are produced at the surfaces, the product is kept in motion continuously and flows in a turbulent fashion towards the product outlet without forming a solid cake layer at the filtration surfaces.

But in the case of many suspensions which have to be filtered the shearing forces which can be obtained in the known filtration apparatus and the turbulence achieved in the filtration chamber are inadequate to prevent the formation of a solid cake layer on the filtration surfaces.

SUMMARY OF THE INVENTION

The invention has as its object to provide a filtration apparatus wherein the formation of a solid cake layer on the filtration surfaces is reliably obviated.

This object is achieved in the filtration apparatus as described initially in that the two surfaces in the form of a body of revolution are arranged eccentrically relatively to one another thus forming an annular filtration chamber of eccentrical profil and are so mounted in the housing that even on the narrowest figure of the eccentrical filtration chamber there is left between the surfaces free a sufficient passage for the product passing through the filtration chamber in the direction from the suspension inlet to the product outlet. As a result the periphery of the filtration chamber is acted upon by shearing forces of varying magnitude, the product is moved and agitated along the varying cross-section of the chamber more violently than in the known apparatus, and no cake of product forms at the filtration surfaces.

According to an advantageous constructional form of the invention, the two surfaces which are in the form of bodies of revolution are arranged in the housing so as to be capable of rotating in opposite directions to one another.

According to a further constructional form the internal filtration surface is arranged in the housing so as to be capable of rotating and also of revolving in planetary fashion relatively to the external filtration surface. The external filtration surface is arranged in a stationary manner in the housing.

BRIEF DESCRIPTION OF THE DRAWING

The subject of the present invention will be described in detail and explained hereinafter with reference to the drawings. In the drawings.

DESCRIPTION OF THE PREFERRED EMBODIMENTS

Figure 1:
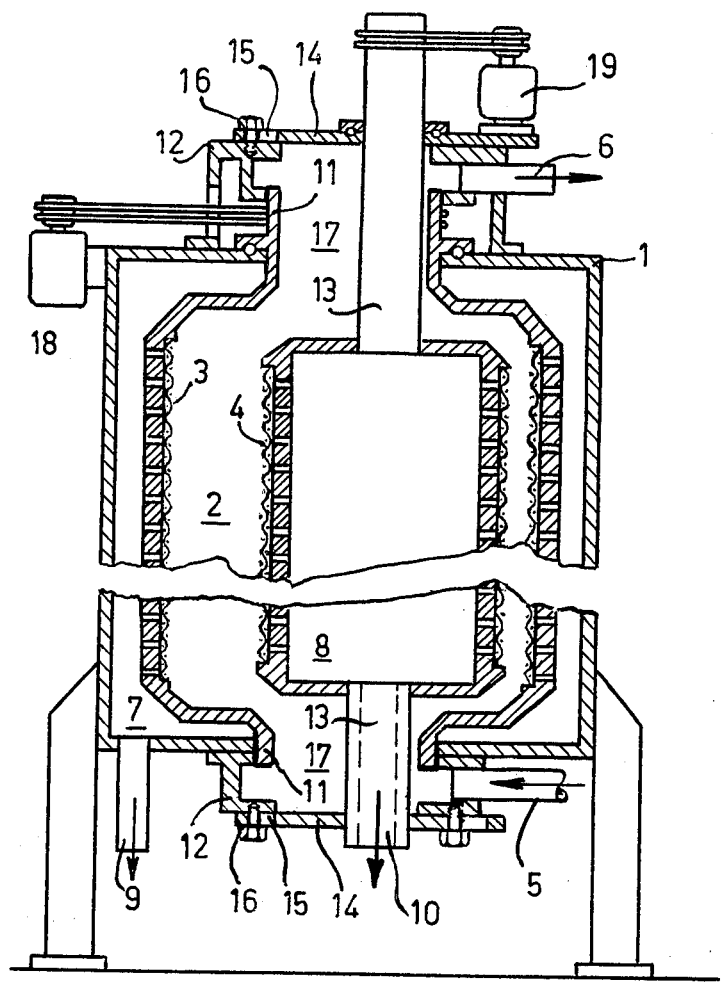
FIG. 1 shows in diagrammatic manner a first constructional example.

A filtration apparatus comprises in a housing 1 an annular filtration chamber 2 which is formed between an external filtration surface 3 in the form of a body of revolution and an internal filtration surface 4 which is nested therein and is also in the form of a body of revolution. The surfaces 3 and 4 are of cylindrical construction. The suspension to be filtered is taken into the filtration chamber 2 under pressure through a suspension inlet 5. The liquid of the suspension passes through the filtration surfaces 3 and 4 and the product flows through the filtration chamber 2 and is taken away through a product outlet 6. In order to regulate the filtration pressure in the filtration chamber 2, a valve not shown here is arranged at the product outlet. The liquid which has passed through the filtration walls is collected as filtrate in respective filtrate discharge collectors 7 and 8 which are arranged one at each of the remote sides of the filtration surfaces 3 and 4, and taken away through ducts 9 and 10 respectively.

The two surfaces 3 and 4, each of them is formed as a filtering surface, are arranged eccentrically relatively to one another and mounted in the housing 1. The cylindrical external filtration surface 3 merges at its two ends in each case into a hollow shaft 11 which is mounted to be rotatable in the housing 1 and in a housing part 12 secured on the said housing respectively so as to be capable of rotating, and in sealing-tight manner. The internal filtration surface 4 is continued at each of its two ends in a shaft 13 which is mounted to be capable of rotating and in sealing-tight fashion in a housing 1 and in a plate 14 secured to the housing part 12. The two plates 14 close the two ends of the filtration chamber 2. The two plates 14 are provided with slots 15 so that after the loosening of screws 16 by means of which the plate 14 is secured relatively to the housing part 12, they can be displaced in a radial direction. In this way, by displacement of the plates 14 it is possible to adjust any desired eccentric position for the internal filtration surface 4 relatively to the external filtration surface 3. The lower shaft 13 of the internal filtration surface 4 in the drawings is constructed as a hollow shaft, the hollow interior being used as a filtrate discharge duct 10 for taking away the filtrate from the filtrate disharge collector 8.

A space 17 left free in each case between the hollow shaft 11 and the shaft 14 is used as a path for the suspension to be processed and for the product respectively, and is connected with the suspension inlet 5 and to the product outlet 6 as appropriate.

The two filtration surfaces 3 and 4 are capable of rotating in opposite directions. It would also be possible to make the two filtration surfaces rotate in the same direction of rotation, for example at different rotational speeds. Or it would also be possible to make only one of the two surfaces rotate. E.g., only one surface 3 or 4 being formed as filtration surface, would be possible too.

The driving of the rotating filtration surfaces 3 and 4 is effected by means of a motor 18 and a motor 19 respectively. The two motors 18 and 19 are capable of rotating in both directions and their rotational speed can be regulated.

It is possible to give the filtration surfaces which are in the form of a body of revolution a shape which is other than cylindrical. For example they could be given a conical shape. Using a conical shape, the cross-section of the filtration chamber could be modified not only by radial displacement of the shaft 13 but also by axial displacement of the shaft 13.

With the cylindrical form of the filtration surfaces shown here it would be possible to provide an additional axial to-and-fro movement, for example of the internal filtration surface.

Figure 2:
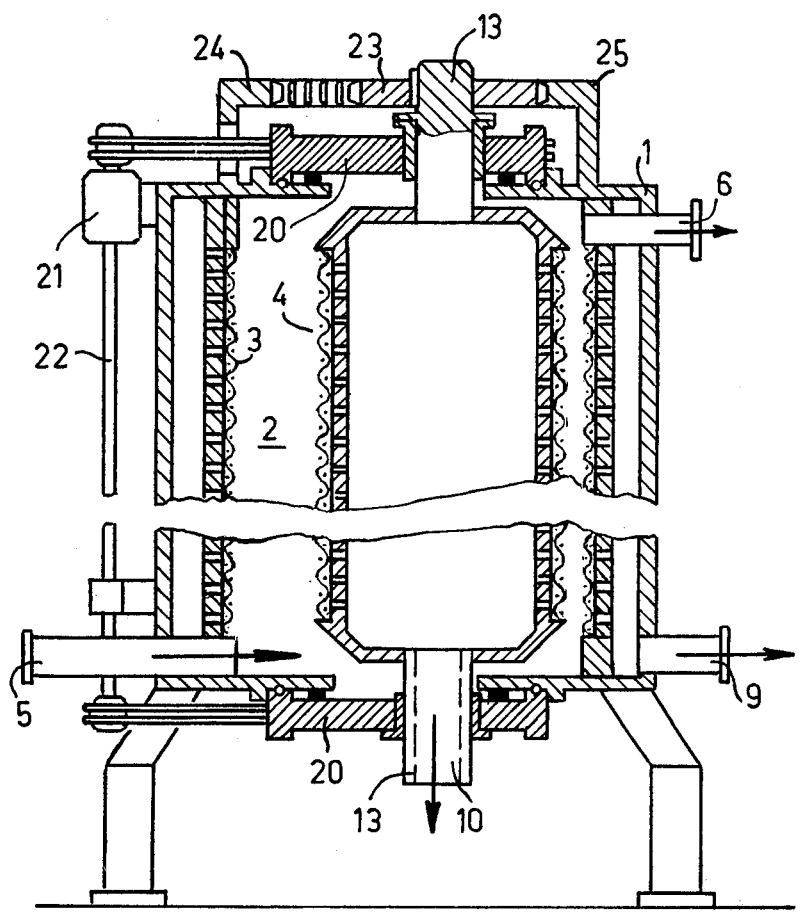
FIG. 2 shows a diagrammatic view of a second constructional example.

In the filtration apparatus shown in FIG. 2, the external filtration surface 3 is arranged in a stationary manner in the housing 1. A suspension inlet 5 extends through the external filtration surface 3 into the filtration chamber 2. A product outlet arragned at the other end of the filtration chamber 2 is also guided through the external filtration surface 3. The filtration chamber 2 is closed at both ends by means of a disc 20 in each case. The discs 20 are arranged coaxially relatively to the axis of the cylindrical external filtration surface 3 and are mounted on the housing 1 to be capable of rotating but in such a manner as to be incapable of displacement in the axial direction, and the gaps between them and the housing 1 are sealed. In the discs 20 and the shafts 13 are mounted in an eccentric fashion. A motor 21 comprises a long shaft 22 and is used for synchronous driving of the two discs 20. The motor 21 is capable of rotating in both directions and its rotational speed can be regulated. When the discs 20 rotate, the internal filtration surface 4 is driven along a path of revolution. Rotation of the internal filtration surface 4 along a planetary path of travel about its axis is brought about by means of a planetary gear. The planetary gear comprises a planet wheel 23 which is secured on the shaft 13 of the internal filtration surface 3. The planet wheel 23 co-operates with a sun wheel 24 which is secured by means of a holder 25 on the housing 1.

Figure 3:
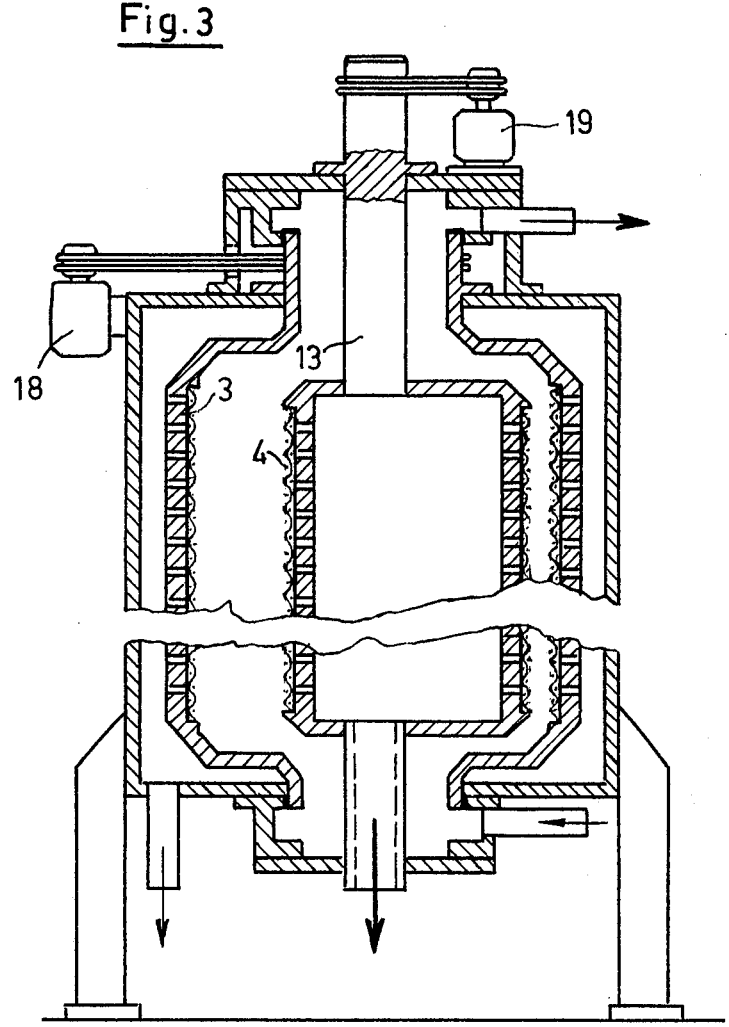
FIG. 3 shows in diagrammatic manner a third constructional example, in axial cross-section in each case.

The filtration apparatus which is shown in FIG. 3 differs from the constructional examples shown in FIG. 1 and in FIG. 2 in that the internal filtration surface 4 is mounted to be capable of rotating in the housing 1 by means of a shaft 13, the said shaft 13 being arranged eccentrically relatively to the internal filtration surface 4. The shaft 13 is arranged coaxially relatively to the external filtration surface 4. The shaft 13 is driven by means of a motor 19. To drive the external filtration surface 3 which is arranged to be likewise capable of rotating in the housing 1, a motor 18 is provided in this case.

The filtration apparatus according to the present invention can in principle be used in any position in space. However, the vertical arrangement illustrated here is advantageous for reasons of economical use of space.

I claim:
1. Apparatus for filtering a suspension under pressure comprising
   a. a housing containing an elongated annular filtration chamber bounded by external and internal surfaces in the form of bodies of revolution,
   b. at least one of said surfaces being mounted for rotation about its axis, and at least one of said surfaces being formed as a filtering member and being provided with a filtrate discharge collector,
   c. said surfaces being arranged eccentrically relative to each other so that the cross section of said annular chamber varies and has a minimum width sufficient to allow passage of the material being filtered; and
   d. an inlet for introducing suspension under pressure to one end of said annular chamber and an axially spaced outlet for discharging filtered material from the opposite end of that chamber,
   e. whereby the material being filtered is subjected to cyclically varying shearing forces as it passes through the annular chamber and caking of the filtering member is avoided.
2. Apparatus as defined in claim 1 in which
   a. said surfaces have cylindrical shapes;
   b. the internal surface is carried by a pair of coaxial shafts which are mounted for rotation in plates which close the opposite ends of said annular chamber; and
   c. the plates are attached to the housing by connections which permit adjustment of the plates in a radial direction, whereby the degree of eccentricity of the two surfaces may be changed.
3. Apparatus as defined in claim 1
   a. in which both of said surfaces are mounted for rotation; and
   b. which includes means for rotating the surfaces in opposite directions.
4. Apparatus as defined in claim 1 in which the internal surface is mounted to both rotate and revolve in planetary fashion relatively to the external surface.
5. Apparatus as defined in claim 4 in which
   a. the internal surface is carried by a pair of coaxial shafts which are mounted for rotation in discs which close the opposite ends of said annular chamber and are, in turn, mounted on the housing for rotation about the axis of the external surface;
   b. said shafts are mounted eccentrically in the discs and are equipped with planetary gear means arranged to rotate the shafts and the internal surface upon rotation of the discs; and
   c. which includes means for synchronously rotating the discs.
6. Apparatus as defined in claim 1 in which the internal surface is carried by eccentric shaft means which is mounted on the housing for rotation about the axis of the external surface.

* * * * *